(12) United States Patent
Fildes et al.

(10) Patent No.: US 8,849,464 B2
(45) Date of Patent: Sep. 30, 2014

(54) FUEL ECONOMIZER ALGORITHM FOR HYDRONIC AND STEAM HEATING SYSTEMS

(75) Inventors: Christopher Fildes, Elyria, OH (US); Timothy Beight, Amherst, OH (US)

(73) Assignee: R.W. Beckett Corporation, North Ridgeville, OH (US)

( * ) Notice: Subject to any disclaimer, the term of this patent is extended or adjusted under 35 U.S.C. 154(b) by 945 days.

(21) Appl. No.: 12/975,560

(22) Filed: Dec. 22, 2010

(65) Prior Publication Data
US 2012/0165992 A1 Jun. 28, 2012

(51) Int. Cl.
G01M 1/38 (2006.01)
F23N 1/08 (2006.01)
F24D 19/10 (2006.01)
G05D 23/19 (2006.01)

(52) U.S. Cl.
CPC ............ *F23N 1/082* (2013.01); *F24D 19/1003* (2013.01); *F23N 2023/48* (2013.01); *F23N 2025/19* (2013.01); *F24D 19/1006* (2013.01); *G05D 23/1904* (2013.01)
USPC ................ 700/277; 700/28; 700/33; 700/278

(58) Field of Classification Search
USPC ........................... 700/275–278, 282, 299–300
See application file for complete search history.

(56) References Cited

U.S. PATENT DOCUMENTS

| 5,971,284 | A | 10/1999 | Hammer | |
|---|---|---|---|---|
| 6,705,533 | B2 * | 3/2004 | Casey et al. | 236/1 E |
| 7,159,789 | B2 * | 1/2007 | Schwendinger et al. | 236/1 C |
| 2008/0251590 | A1 * | 10/2008 | Arneson | 236/1 B |

* cited by examiner

Primary Examiner — Mohammad Ali
Assistant Examiner — Nathan Laughlin
(74) Attorney, Agent, or Firm — Eschweiler & Associates, LLC

(57) ABSTRACT

An economizer component of a controller used for fuel efficient temperature regulation of a medium circulated through a zone within a hydronic and steam heating system is disclosed. The controller component includes an input interface adapted to determine if the system requires heat based on receiving one or more of a call for heat from the zone, or an indication that a burner of the system is active. The component further includes a dynamic adaptation module configured to provide a burner control signal for heating the system if required. The control signal has an adjustable high limit, and the dynamic adaptation module is configured to increment the adjustable high limit by an increment value, to a value no greater than a maximum high limit, if it is determined that the system requires heat, and decrement the adjustable high limit by a decrement value, to a value no lower than a minimum high limit, if it is determined that the system does not require heat. The component is configured to dynamically adapt to changing heating system requirements received by the input interface. The component is adjusted by the dynamic adaptation module, to control the burner by way of the burner control signal to efficiently regulate the temperature of the medium circulated through the zone within the heating system.

17 Claims, 6 Drawing Sheets

FUEL ECONOMIZER ALGORITHM FOR HYDRONIC AND STEAM HEATING SYSTEMS

FIELD OF DISCLOSURE

The present disclosure relates generally to controllers and fuel economizing control algorithms for temperature regulation systems, such as boiler, hydronic and steam heating systems.

BACKGROUND

Boiler systems have been used to regulate the temperature of commercial and residential facilities for a number of years. However, despite the fact that boiler systems have been around for many years, innovations continue to change the manner in which these systems operate.

FIG. 1 illustrates a conventional boiler 100. The boiler 100 includes a boiler tank 102 surrounded by an insulating material layer 104, which is encased within a boiler enclosure 106. A burner 108 works in conjunction with a temperature sensor 110 as directed by a boiler controller 111 to heat water 112 within the tank 102 to a desired temperature. After the water 112 is heated to the desired temperature, a circulation pump 114 pumps the heated water out an outbound line 116 (feedwater line) to a residential or commercial facility 118, for example. After the heated water takes whatever path is desired in the facility 118, the water (now cooled) returns through a supply/return line 120 to the tank 102. In this manner, the water can provide various heating functions to the facility 118. In the event of an over-pressure condition, a pressure relief valve 138 and a discharge line 140 provides means to discharge any excess pressure or steam onto the floor of the boiler room.

Notably, in this conventional boiler 100 the water 112 is always heated between fixed high and low temperature setpoints for circulation to the facility 118. While this streamlined manner of control is efficient in many respects, such a system is less than ideal for several reasons and there is a need for improved fuel efficiency. Therefore, the inventors have devised improved boiler control systems.

SUMMARY

The following presents a simplified summary of the disclosure in order to provide a basic understanding of some aspects of the disclosure. This summary is not an extensive overview of the disclosure, and is neither intended to identify key or critical elements of the disclosure nor to delineate the scope of the disclosure. Rather, the purpose of the summary is to present some concepts of the disclosure in a simplified form as a prelude to the more detailed description that is presented later.

One embodiment relates to an economizer component of a controller used for fuel efficient temperature regulation of a medium circulated through a zone within a hydronic and steam heating system. The economizer component comprises an input interface configured to determine if the system requires heat based on receiving one or more of a call for heat from the zone, or an indication that a burner of the system is active. The economizer component also includes a dynamic adaptation module configured to provide a burner control signal for activating a heating of the system if required, wherein the control signal is subject to an adjustable high limit. The dynamic adaptation module is configured to increment the adjustable high limit by an increment value, to a value no greater than a maximum high limit, if it is determined that the system requires heat, and decrement the adjustable high limit by a decrement value, to a value no lower than a minimum high limit, if it is determined that the system does not require heat. Thus, the heating system is configured to dynamically adapt to changing heating system requirements received by the input interface and adjusted by the dynamic adaptation module, to thereby control the burner by way of the burner control signal to efficiently regulate the temperature of the medium circulated through the zone within the heating system.

Another embodiment relates to a method for efficient temperature regulation of a medium to be circulated through a zone of a hydronic and steam heating system. The method comprises determining if the system requires heat based on receiving one or more of a call for heat from the zone of the system, or an indication that a burner of the system is active. The method also includes incrementing an adjustable high limit by an increment value, to a value no greater than a maximum high limit, if it is determined that the system requires heat, and decrementing the adjustable high limit by a decrement value, to a value no lower than a minimum high limit, if it is determined that the system does not require heat. The method further includes controlling the burner to heat and efficiently regulate the temperature of the medium circulated through the zone within the heating system based on the value of the adjustable high limit. Thus, the heating system is configured to dynamically adapt to the received heating system requirements as adjusted by the incremented and decremented adjustable high limit. Other methods and systems are also disclosed.

The following description and annexed drawings set forth in detail certain illustrative aspects and implementations of the disclosure. These are indicative of but a few of the various ways in which the principles of the disclosure may be employed.

FIGURES

DETAILED DESCRIPTION

Figure 1:
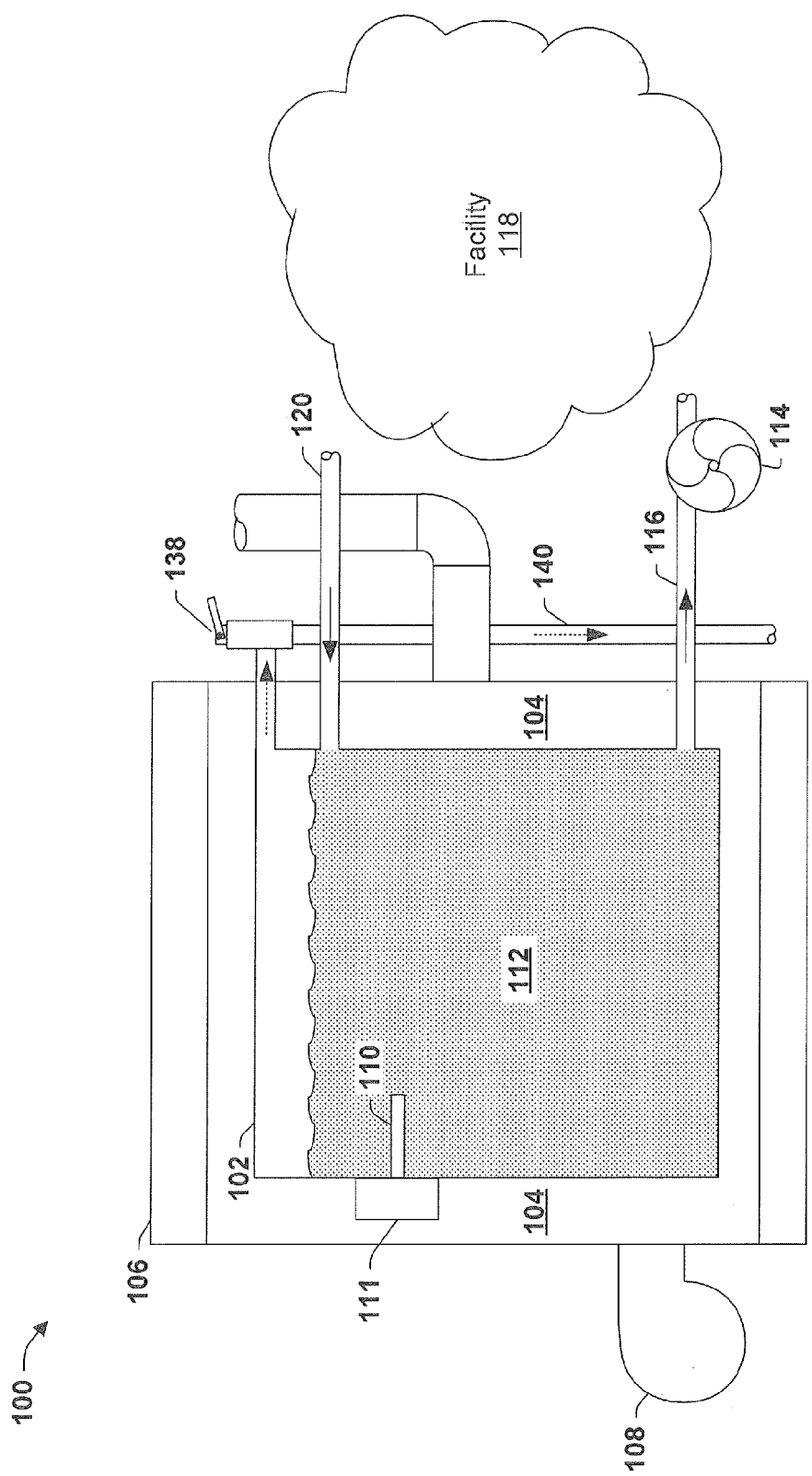
FIG. 1 is a diagram of conventional boiler system that heats a medium to single temperature and circulates the heated medium through a facility.

The present disclosure will now be described with reference to the drawings where like reference numerals are used to refer to like elements throughout, and where the illustrated structures are not necessarily drawn to scale.

Figure 2:
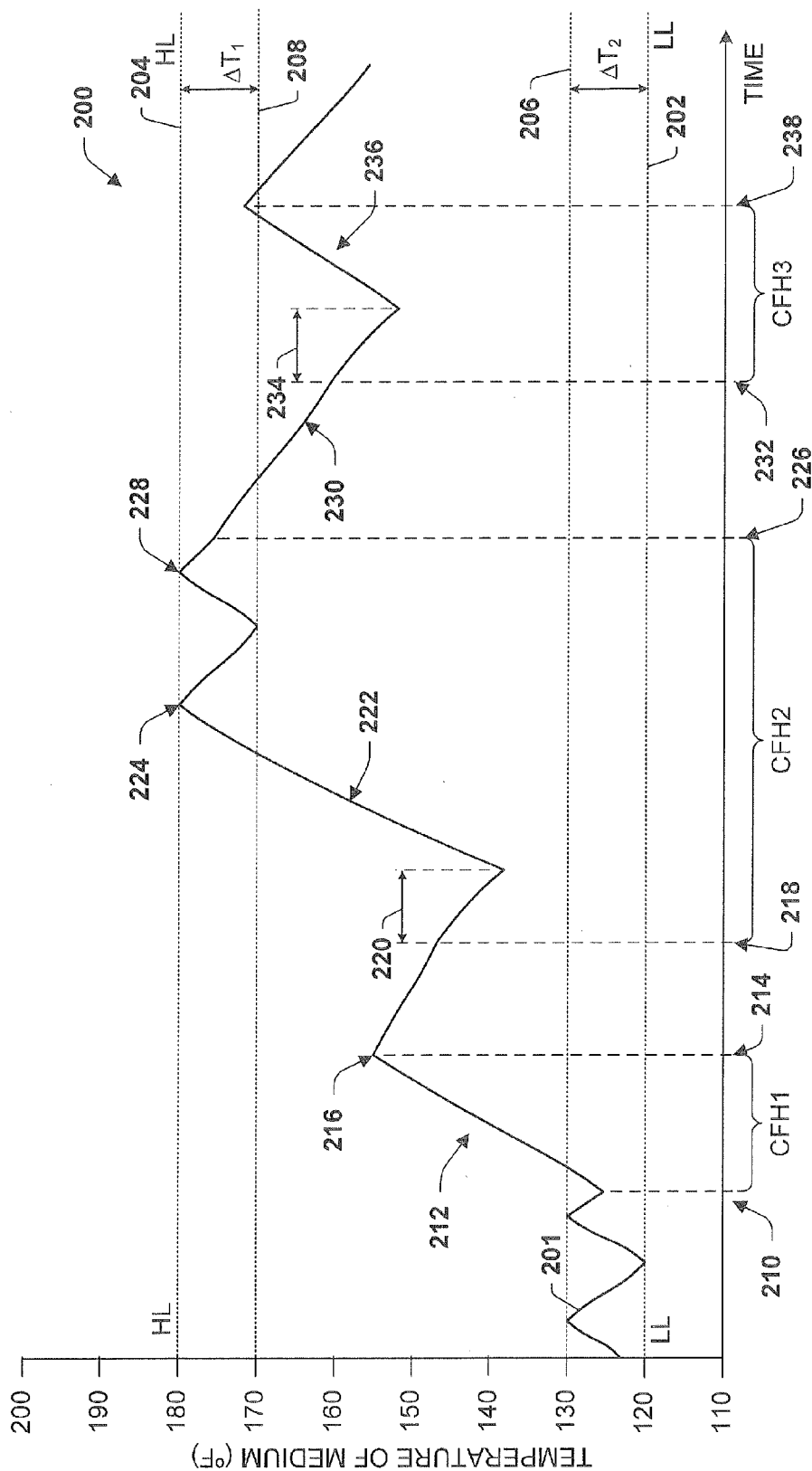
FIG. 2 is a timing diagram illustrating a prior art boiler limit controller utilizing a hold-off economizer having a boiler hold-off time concept to regulate the temperature of a medium in a boiler system.

Initially turning to prior art FIG. 2, many controllers employ a low limit (LL) and a high limit (HL) to constrain a medium temperature (e.g., water) of a boiler (or other type heating appliance) between lower and upper limits, respectively. For example, as shown in FIG. 2 a low limit (LL) 202 may be set at about 120 degrees F., while a high limit (HL) 204 may be set at about 180 degrees F. The low limit (LL) 202 is optional, but is typically employed to maintain a tank water temperature 201 at some minimum level so that upon a call for use of the water, it does not take an inordinate amount of time to get the desired water temperature. The low limit (LL) 202 level is typically set by a technician or set as a default value. A high limit (HL) 204 is employed to prevent the water temperature from exceeding some predetermined level to avoid a situation where water having an undesirably high temperature reaches a recipient.

In addition to the low limit (LL) 202 and the high limit (HL) 204 set points, conventional controllers employ hysteresis that is sometimes referred to as low limit and high limit differentials 206 and 208, respectively. The low limit differential 206 is a predetermined temperature threshold value that exceeds the low limit (LL) 202 by a differential amount $\Delta T_2$, such that when the water temperature falls below the low limit (LL) 202 and the burner is activated despite no call for heat, the controller does not immediately turn off once the water temperature exceeds the low limit (LL) level 202. Rather, the burner stays on (via the controller) until the water temperature reaches the lower differential 206. At this water temperature level, the controller instructs the burner to turn off, thus allowing the water temperature to slowly decrease back toward the low limit (LL) 202. The system will then cycle the burner on and off to maintain the water temperature between the low limit (LL) 202 and the low differential 206 as shown.

At a time period 210, a call for heat (CFH1) is received by the controller, and the burner is turned on, causing the medium temperature to steadily increase, as shown in region 212. After some time period, the first call for heat (CFH1) is finished at 214 (e.g., a temperature sensor (thermostat) no longer requests further heating), and the controller turns off the burner, and the temperature of the water begins to decrease at 216. At a later time 218, a second call for heat (CFH2) begins. In some conventional controllers, the controller will immediately activate the burner upon the call for heat. In other conventional controllers, as illustrated in prior art FIG. 2, the controller will not immediately activate the burner upon a call for heat, but will instead institute some form of delay. For example, either a temperature reading of water at some inlet or outlet pipe, or activation of a timer, will result in the controller delaying activation of the burner for some hold-off time 220 as illustrated in order to save fuel in instances where activation of the burner is not needed because the water temperature is sufficient to satisfy demand.

After expiration of the hold-off time 220, if the second call for heat (CFH2) is still asserted, the controller activates the burner, resulting in a steady increase of the water temperature at 222. Once the water temperature reaches the high limit (HL) 204 at 224, the burner is deactivated by the controller in order to prevent the water temperature from exceeding the threshold, thus resulting in a decrease in medium temperature despite the second call for heat (CFH2) still being asserted. The water temperature then declines as a result of the burner being turned off, and once the water temperature falls below the high limit differential 208, the controller activates the burner as long as the second call for heat (CFH2) is still asserted. The control cycle between the high limit (HL) 204 and the high limit differential 208 then continues until the second call for heat (CFH2) time period ends at 226. As shown in FIG. 2, since the controller had deactivated the burner after reaching the high limit (HL) at 228, the medium temperature continues to decrease at 230 until a third call for heat (CFH3) is asserted at 232. Again, since the medium temperature is sufficient to satisfy demand, one type of conventional controller employs a burner hold-off time at 234 to keep the burner off despite the call for heat, causing the water temperature to continue to decrease. After expiration of the hold-off time 234, since the third call for heat (CFH3) is still asserted, the controller activates the burner, and the water temperature continues to increase at 236 until the third call for heat (CFH3) ends at 238. Afterwards, the water temperature will continue to decrease absent another call for heat until the water temperature falls below the low limit (LL) 202.

As can be seen from the above description in conjunction with the graph of prior art FIG. 2, conventional controllers use a fixed high limit (HL) 204 and a fixed low limit (LL) 202 to control a burner to ensure that a medium temperature stays between a predefined range. In addition, some conventional controllers employ a burner hold-off time feature to momentarily override a call for heat in certain situations to reduce fuel usage while concurrently attempting to ensure that the medium temperature stays within the predetermined range. While such controllers operate adequately in some instances, it is desirable to further improve such controllers.

Figure 3:
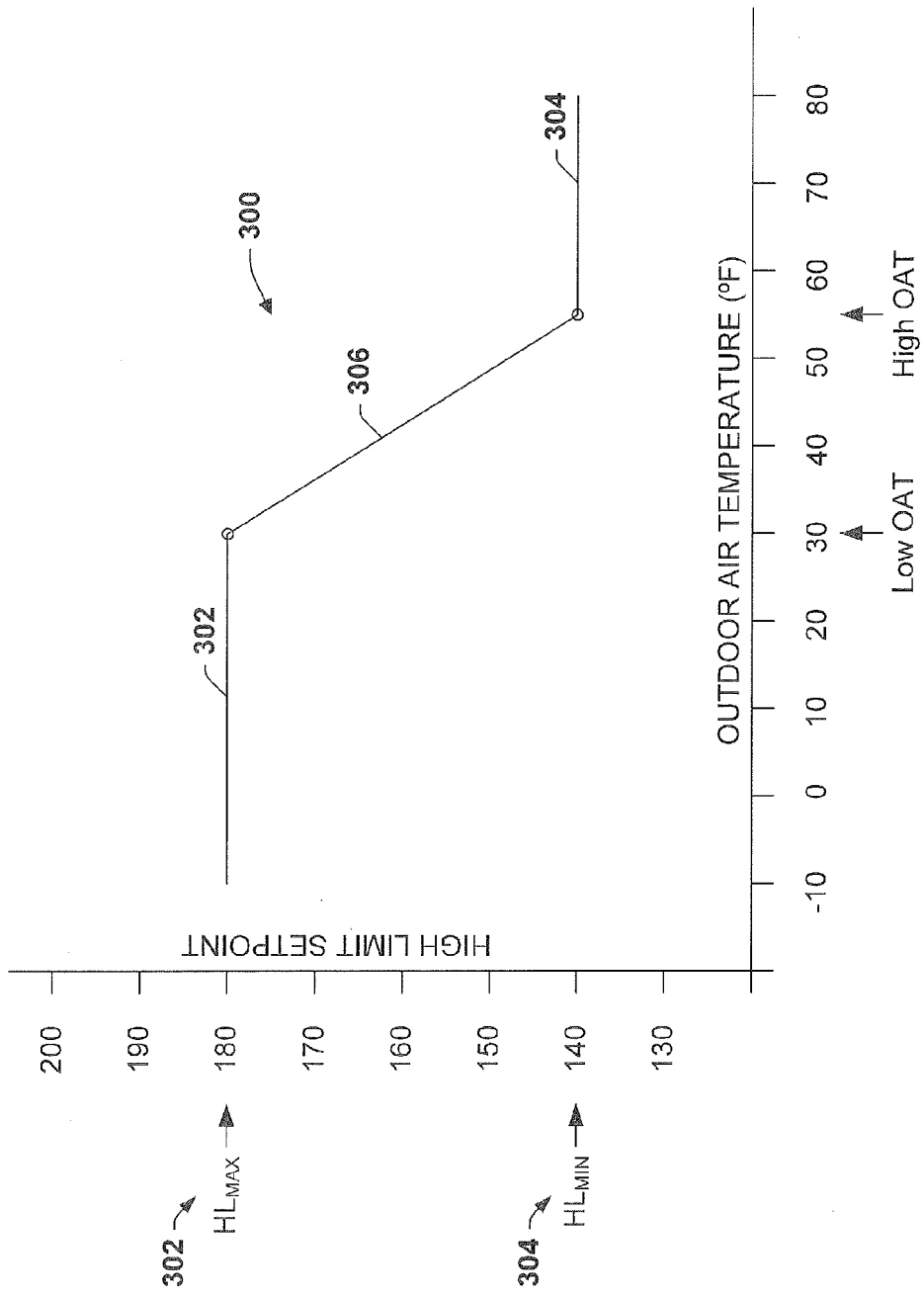
FIG. 3 is a timing diagram of an adjustable high limit for a prior art controller that is varied as a function of an external ambient temperature.

In the example of prior art FIG. 2, a static high limit (HL) is employed. In another type of conventional controller, a dynamic high limit (HL) is utilized, as illustrated in prior art FIG. 3. FIG. 3 is a graph that shows a high limit (HL) 300 that varies between a maximum high level (HLmax) 302 and a minimum high level (HLmin) 304 as a function of the outdoor air temperature (OAT). As shown in the graph 300, the high limit 302 is a fixed maximum amount (HLmax) for Outdoor Air Temperatures (OATs) of 30 degrees F. or less. The high limit (HL) is also a fixed minimum value (HLmin) for OATs of about 55 degrees F. or more. In an intermediate range of OATs, the high limit (HL) comprises a variable value 306 that varies, for example, in a linear fashion between the maximum 302 and the minimum 304.

The dynamic high limit (HL) 300 of FIG. 3 is then imported into the controller operation illustrated by the graph 200 in prior art FIG. 2, wherein the dynamic high limit (HL) 300 replaces the static high limit (HL) 204. The goal of such a dynamic HL is that when external temperatures are cold, the system benefits from a higher HL to meet the more demanding heating needs of a cold environment, while for warmer temperatures, a cooler average water temperature may still effectively meet the less stringent heating needs. Some challenges with such a conventional approach includes the external temperature sensor used for establishing the OAT providing aberrant readings, for example, if physically located next to an external dryer vent, or when located in a sunny location that provides higher readings than the actual OAT.

Figure 4:
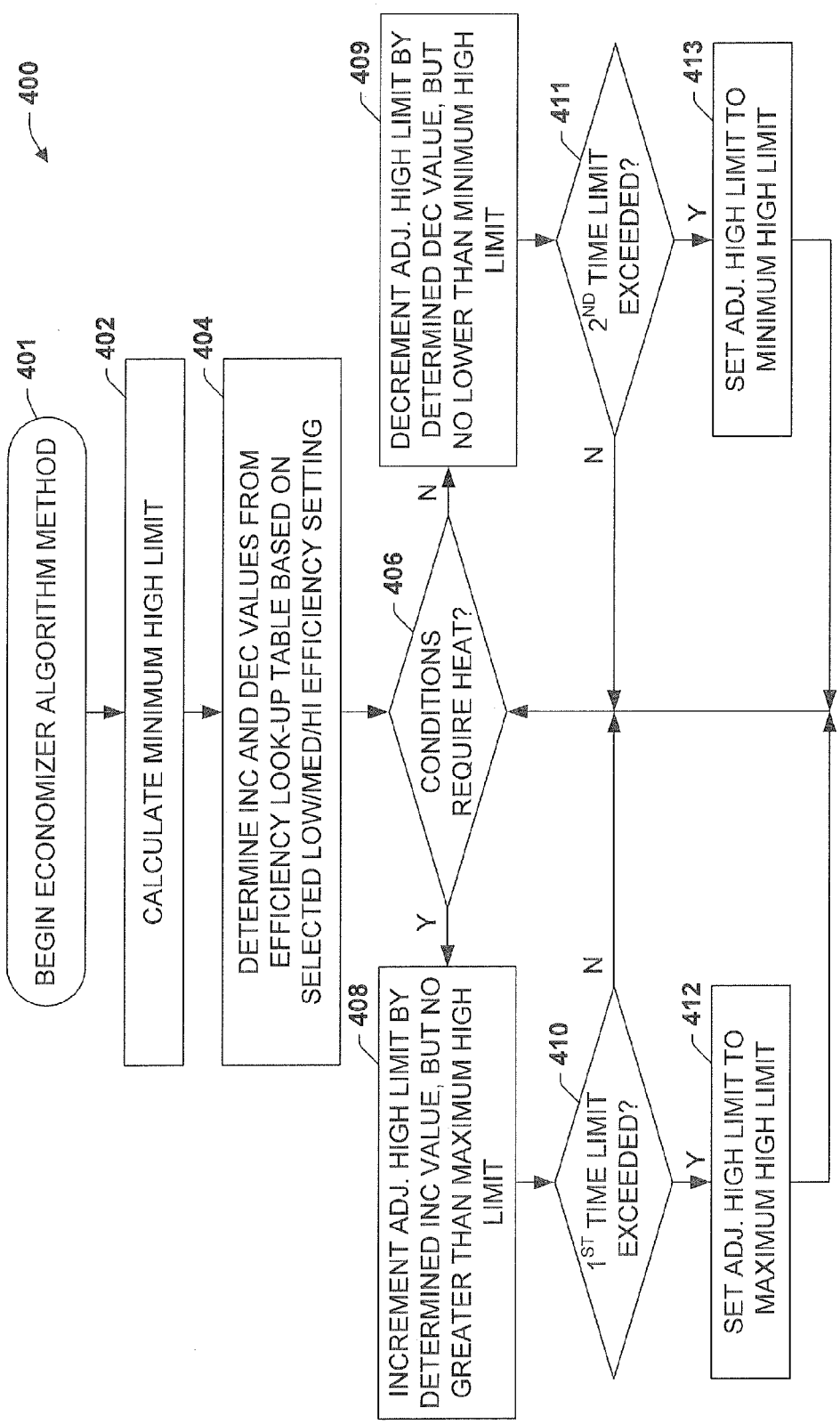
FIG. 4 is a flow diagram illustrating an economizer algorithm and method for temperature regulation of a medium to be circulated through one or more zones of a facility.

Referring to FIG. 4, a method 400 for controlling a burner in conjunction with a temperature regulation system is disclosed. While the exemplary method 400 is illustrated and described below as a series of acts or events, it will be appreciated that the present invention is not limited by the illustrated ordering of such acts or events. For example, some acts may occur in different order and/or concurrently with other acts or events apart from those illustrated and/or described herein, in accordance with the invention. In addition, not all illustrated steps may be required to implement a methodology in accordance with the present invention. The method comprises providing an adjustable (i.e., dynamic) high limit (HL) that varies as a function of time.

The method 400 begins at 401 with an initiation of the economizer algorithm method, and proceeds to a determination of a minimum high limit at 402. As will be further appreciated in conjunction with the graph of FIG. 5, the minimum high limit (HLmin) comprises a predetermined minimum level that the dynamic high limit (HL) is not permitted to fall below. Therefore the minimum high limit (HLmin) comprises a floor for the adjustable (dynamic) high limit. In one example, such a minimum high limit may equal 145 degrees F., however, it will be appreciated that such a floor may comprise any desired predetermined floor value.

The method 400 then proceeds to 404, wherein increment and decrement values for varying the adjustable high limit (HL) are determined. In one embodiment such increment and decrement values may be selected based upon a selected efficiency level. For example, if two available fuel efficiency options are desired (e.g., high efficiency and low efficiency), differing increment and decrement values for the adjustable high limit (HL) may be employed. In one example, for a high efficiency mode, the method 400 may increase the adjustable high limit (HL) at a rate of 2 degrees/t, wherein "t" represents some predefined time period. In one example, "t"=2 minutes, such that the adjustable high limit (HL) is increased by 2 degrees F. every 2 minutes under certain conditions to be discussed infra. Further, for a low efficiency mode, the method 400 may determine the adjustable high limit (HL) to increase by 3 degrees F./t. Similarly, the method determines the decrement values for multiple efficiency modes, wherein a decrement value for the high efficiency mode may be 3 degrees F./t, while the decrement value for the low efficiency mode may be 2 degrees F./t, for example.

While in the present example, two different efficiency modes are provided, it should be understood that only a single efficiency mode may exist or that more than two efficiency modes may exist, and all such variations are contemplated as falling within the scope of the present invention. In one embodiment the method 400 determines such increment and decrement values by selecting such values from a look-up table based on a selected desired efficiency, however, any manner of determining such values may be employed.

Referring again to FIG. 4, the method 400 proceeds to 406, wherein a determination is made whether system conditions exist that require heat. For example, a query may be made to determine whether a call for heat (CFH) has been asserted, or ascertain whether a burner associated with the system is active. If a determination is made that conditions require heat (YES at 406), the method 400 proceeds to 408, wherein an increment of the adjustable (dynamic) high limit is made from its present value. Such increment is conditioned upon the adjustable high limit (HL) not exceeding the maximum high limit (HLmax) set by the method 400. After incrementing the adjustable high limit (HL) a determination is made whether an amount of time associated with successive increments of the adjustable high limit (HL) has exceeded a first time limit at 410 (e.g., a first time limit of twenty (20) minutes representing ten (10) successive increments of the adjustable high limit during a single call for heat, when each increment occurs every two (2) minutes). Alternatively, such determination may comprise a count of a number of consecutive limit increments.

If the first limit at 410 is not exceeded (NO at 410), the method 400 continues back to 406 where another query is made whether conditions still require heat after the time period "t" has elapsed. If yes, then the method 400 again proceeds to 408 and then again to 410. In this manner, the adjustable high limit (HL) is periodically incremented in a stepwise fashion every t minutes by an increment value determined at 404 until either a call for heat (or other condition) stops at 406, or the first time limit is exceeded at 410. In the instance where the first time limit is exceeded (YES at 410), the adjustable high limit is automatically adjusted to its maximum high limit value (e.g., HLmax).

As can be seen from the above discussion, in instances where a determination is made that a condition exists that requires heat, the method 400 increments the adjustable high limit (HL) in a periodic fashion as long as the conditions still require heat and as long as a first time limit is not exceeded. If the first time limit is exceeded, a conclusion is made that aggressive heating requirements exist and the adjustable high limit (HL) is not increasing fast enough to satisfy the demand, so in such instances a determination is made to automatically increase the adjustable high limit (HL) to its maximum high limit value (HLmax).

Returning to FIG. 4, if a determination is made that system conditions do not require heat (NO at 406), the method 400 proceeds to 409, wherein the adjustable high limit is decremented by the decrement value determined at 404. Such decrementing occurs at 409 as long as the adjustable high limit (HL) has not fallen below the minimum high limit that was determined at 402. The method 400 proceeds to 411, wherein another query is made whether a time period associated with successive decrements of the adjustable high limit exceeds a second time limit. If not (NO at 411), the method 400 proceeds back to 406 after the time period "t" has elapsed and then back to 409 if conditions still do not require heat. Further decrementing of the adjustable high limit (HL) continues until either HLmin is reached or the second time limit is exceeded at 411. Upon the second time limit being exceeded at 411, the method 400 adjusts the high limit down to its minimum value (HLmin).

Figure 5:
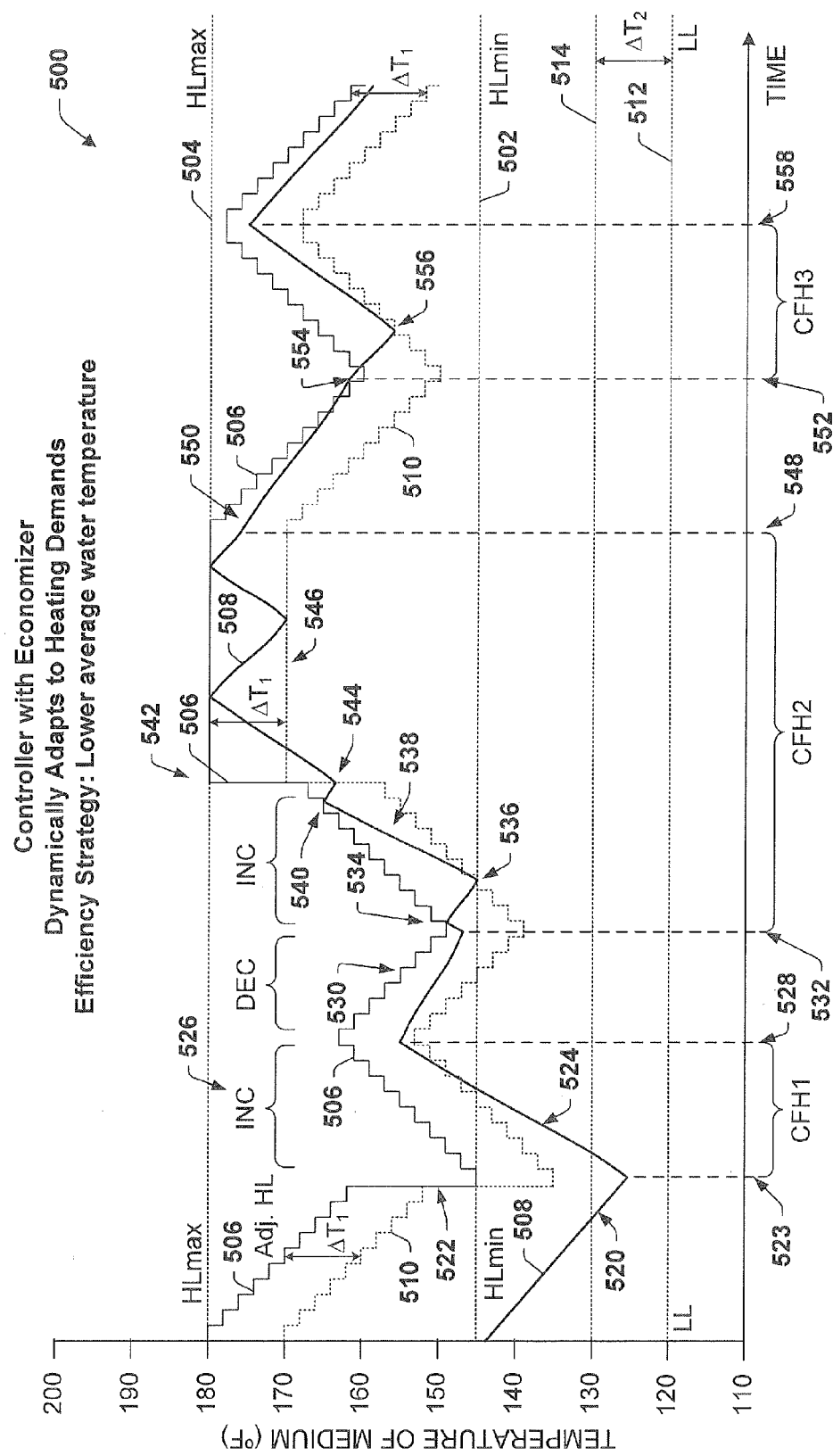
FIG. 5 is a timing diagram illustrating an example of a hydronic and steam heating system controller with an economizer which dynamically adapts to heating demands, having an efficiency strategy to lower the average water temperature of the medium within the heating system during various conditions.

The manner in which the method 400 operates to adjust the high limit may be further appreciated in context of a graph 500 in FIG. 5. FIG. 5 illustrates how the method 400 is executed via a controller to dynamically adjust the high limit (HL) in response to heating demands. As shown in FIG. 5, a minimum high limit (HLmin) 502 is established (see 402 in FIG. 4), which in this example is set at 145 degrees F. This is a floor below which the adjustable high limit (HL) is not permitted to fall below. The maximum high limit (HLmax) 504 is also established prior to method execution, and such limit prevents the water temperate from exceeding some maximum predetermined value, which in this example is 180 degrees F.

The adjustable high limit (Adj. HL) is shown at 506, while the actual water temperature is shown at 508. In addition, a high limit differential 510 exists that is also adjustable and varies in lock step with the adjustable high limit (Adj. HL) 506 in one embodiment. The difference between the adjustable high limit (Adj. HL) 506 and the high limit differential is $\Delta T_1$ as shown. In addition, a low limit (LL) 512 exists, as well as a low limit differential 514, wherein the difference between the low limit (LL) 512 and the low limit differential 514 is $\Delta T_2$.

Initially there is no call for heat and the water temperature 508 is slowly decreasing in region 520. As was discussed supra, if the water temperature 508 falls below the low limit (LL) 512, despite no call for heat, the controller will activate the burner to ensure that the water temperature stays about a predetermined minimum temperature as set by the low limit (LL) 512. However, during this time period the adjustable high limit (Adj. HL) 506 periodically decrements from HLmax at a predefined decrement amount (e.g., 2 degrees F.) at a predefined decrement internal (e.g., every two minutes) as shown at 409 in FIG. 4.

At 522, the amount of time that the adjustable high limit (Adj. HL) has been periodically decremented exceeds the second time limit (e.g., greater than 20 minutes as shown at 411 in FIG. 4), and the adjustable high limit (Adj. HL) is then set to the minimum high limit (HLmin), as shown in FIG. 5 at 522. A short period of time later, a first call for heat (CFH1) is received (YES at 406), and the controller begins to increment the adjustable high limit (Adj. HL) 506 in a periodic fashion as provided at 408 in FIG. 4. As illustrated in FIG. 5, during the first call for heat (CFH1) at 523, the water temperature 508 steadily increases at 524 and because the adjustable high limit (Adj. HL) 506 is incremented periodically during this time at 526, the water temperature 508 does not exceed the adjustable high limit (Adj. HL) 506, and thus the controller does not deactivate the burner. At 528 the first call for heat (CFH1) terminates (NO at 406), and the adjustable high limit (Adj. HL) 506 begins to decrement again at 530. With the termination of the first call for heat (CFH1), the controller shuts off the burner and the water temperature 508 begins to decline.

At 532 a second call for heat (CFH2) occurs and is detected by the controller. As shown at 534, an increase in water temperature 508 causes the water temperature to reach the adjustable high limit (Adj. HL) 506, causing the controller to deactivate the burner despite the assertion of the second call for heat. As the burner is shut off, the water temperature 508 declines until it reaches the high limit differential 510 at 536 that is incrementing in lockstep with the adjustable high limit (Adj. HL) 506. At 536 the controller turns the burner back on since the second call for heat (CFH2) is still asserted, causing the water temperature to rise at 538. The water temperature 508 again reaches a level where the temperature reaches the adjustable high limit (Adj. HL) 506 at 540, causing the controller to again shut off the burner, causing the water temperature 508 to decrease. At 542, a situation arises where the adjustable high limit (Adj. HL) 506 has periodically incremented for a time period that exceeds the first time limit (e.g., 20 minutes at 410 in FIG. 4), at which point the controller automatically raises the adjustable high limit (Adj. HL) 506 all the way up to the maximum high limit (HLmax). Similarly, the high temperature differential 510 also increases, causing the water temperature 508 to hit such limit at 544, resulting in the controller turning the burner back on. The adjustable high limit (Adj. HL) 506 is thus increased immediately up to the HLmax in circumstances when the adjustable high limit (Adj. HL) 506 has been periodically incremented in a continuous fashion for a time period that exceeds some predetermined time period (e.g., 20 minutes). During time period 546, the second call for heat (CFH2) continues and the controller turns the burner off and on intermittently as the water temperature bounces between HLmax and the high temperature differential 510.

At 548 the second call for heat (CFH2) ends, and the controller begins to decrement the adjustable high limit (Adj. HL) 506 (409 in FIG. 4) as the water temperature 508 continues to decline at 550. At 552, a third call for heat (CFH3) is asserted, however, at 554 it can be seen that the water temperature 508 exceeds the adjustable high limit (Adj. HL). Consequently, despite the assertion of a call for heat, the controller does not turn on the burner, and the water temperature 508 continues to decline. At 556, the water temperature 508 falls below the high temperature differential 510, causing the controller to again activate the burner, since the third call for heat is still asserted. The water temperature 508 then begins to steadily increase while the adjustable high limit (Adj. HL) 506 continues to periodically increase. At 558 the third call for heat (CFH3) is discontinued, resulting in the water temperature decreasing in response to the controller turning off the burner. The adjustable high limit (Adj. HL) 506 also begins to periodically decrement (NO at 406 and proceeding to 409 in FIG. 4), as illustrated in FIG. 5.

As can be seen in FIGS. 4 and 5, the controller and associated method of the present invention advantageously improve fuel efficiency through use of an adjustable high limit (Adj. HL) that varies as a function of heat conditions and time.

Figure 6:
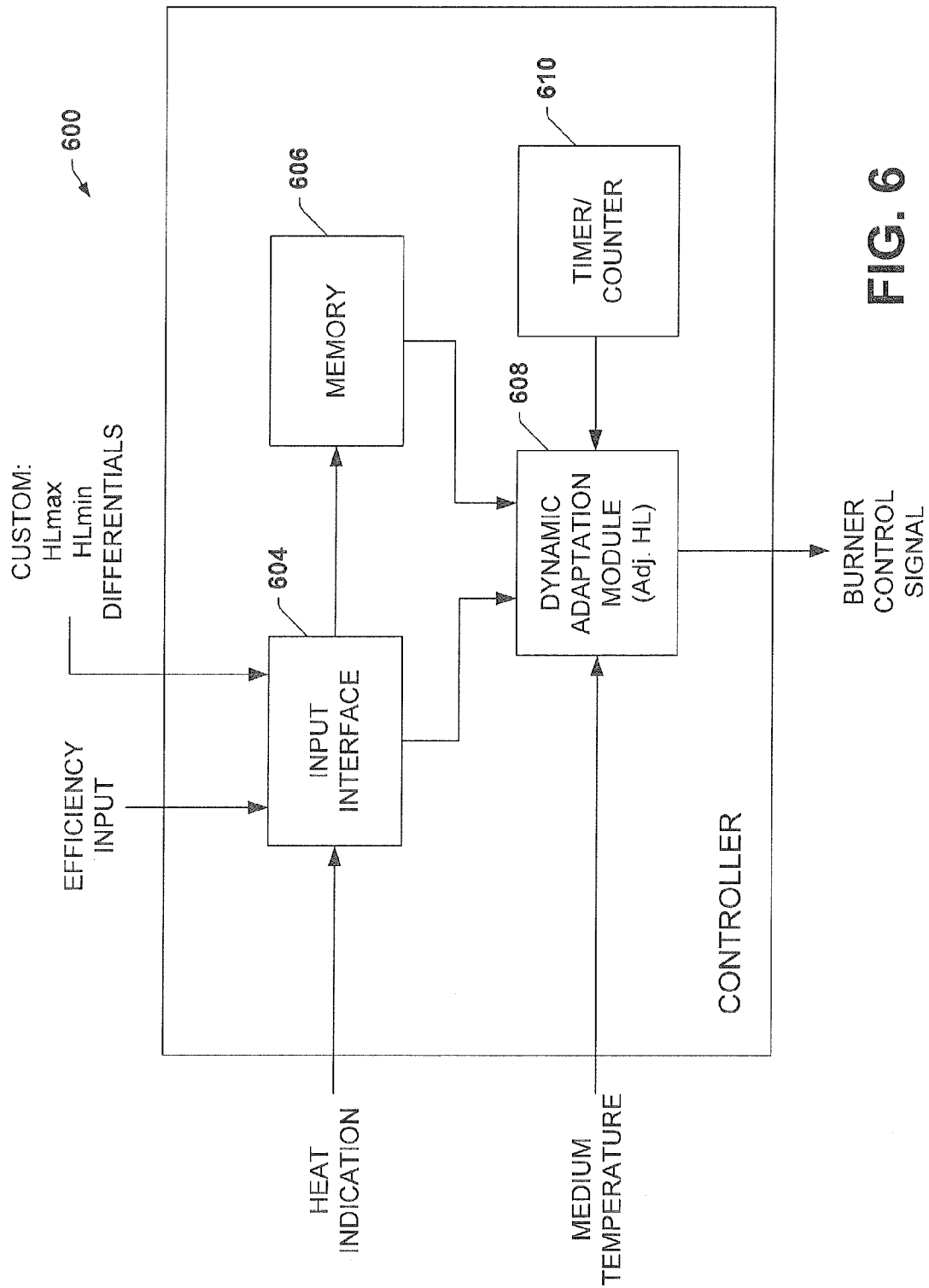
FIG. 6 is a block diagram illustrating a controller for fuel efficient temperature regulation of a medium according to one embodiment.

FIG. 6 is a schematic/block diagram of a controller 600 that is operable to regulate a medium such as water through a zone in a heating system according to one embodiment of the invention. The controller 600 includes an input interface 604 that is configured to receive input data or signals in one or more formats. In one embodiment the input interface receives a heat indication such as a call for heat from a system thermostat, or an indication that a burner operably associated with the system is active. Such a heat indication may include one or multiple input signals in analog or digital format. The input interface 604 is further configured to receive an efficiency input such as a low/medium/high efficiency selection signal or other user selected input signal or indication. In addition, the input interface 604 is configured to receive custom data such as a desired HLmax, HLmin, $\Delta T_1$ and $\Delta T_2$ differentials, etc. Such input data can be entered by a technician or by other means as may be desired. In one embodiment, the input interface may comprise one or more serial or parallel data ports, toggle switches, a touch input pad, or other input device. Any means for entering such data may be utilized and all such variations are contemplated as falling within the scope of the invention.

The controller 600 further comprises a memory 606 that is operably connected to the input interface 604 either directly or via a data bus. The memory 606 is configured to store data such as efficiency related increment and decrement values, the custom data relating to, for example, HLmax, HLmin, $\Delta T_1$ and $\Delta T_2$ differentials, etc. In one embodiment the memory 606 comprises a look-up table that is preconstructed or customizable via the input interface 604, for example. Alternatively, any form of memory may be employed and all such alternatives are contemplated as falling within the scope of the invention.

Still referring to FIG. 6, the controller 600 comprises a dynamic adaptation module that is operably coupled to the input interface 604 and the memory 606. The dynamic adaptation module receives the heat indication and the efficiency input via the input interface 604 and operates to retrieve the necessary HLmax, HLmin and temperature differentials upon either a system initialization or other initiation signal or instruction. Upon receipt of the heat indication, the dynamic adaptation module adjusts the adjustable high limit (Adj. HL) in a manner similar to that shown and described in conjunction with FIGS. 4 and 5. More particularly, the dynamic adaptation module 608 receives the medium temperature from a tank temperature sensor (not shown) that provides a temperature reading associated with the medium temperature in the tank associated with the heating system. The module 608 compares the medium temperature to the adjustable high limit (Adj. HL) and based on the state of the heat indication selectively asserts the burner control signal to activate the burner. The dynamic adaptation module 608 is also operatively coupled to a timer or counter 610 that operates to provide an elapsed time or count value that the module 608 uses to determine when the adjustable high limit (Adj. HL) is to be incremented or decremented. The dynamic adaptation module 608 may also use the elapsed time or count value to identify the system conditions when the adjustable high limit (Adj. HL) is altered to the HLmax or the HLmin. In one embodiment the dynamic adaptation module 608 comprises a programmable controller, however, such module may also be constructed in hardware, or may be a combination of hardware or software. Any device or combination of devices configured to achieve the above functionality may be employed and all such variations are contemplated as falling within the scope of the present invention.

In addition, although examples have been described above in the context of a temperature regulation system having a storage tank that stores a medium (e.g., a hot water tank), it will be appreciated the concepts described herein are also applicable to "tankless" water heaters. In tankless water heaters, water or some other medium is quickly heated at a manifold as the water is flowing to a zone. Other variations are also possible.

In addition, although in some embodiments features can be implemented as hardware modules, in other embodiments the features can be performed by appropriate software routines or a combination of hardware and software. In regards to software implementations, the software may be read from a "computer-readable medium", which includes any medium that participates in providing instructions to a node or to digital circuitry associated with the node. Such a medium may take numerous forms, including but not limited to, non-volatile media, volatile media, and transmission media. Non-volatile media includes, but is not limited to: magnetic disks, flash disks, EEPROM, and optical disks such as CDs or DVDS. Volatile media includes dynamic memory, including but not limited to: SRAM or DRAM. Transmission media includes, but is not limited to: coaxial cables, copper wire, fiber optics, etc. Transmission media can also include electromagnetic waves, such as a voltage wave, light wave, or radio wave.

In regard to the various functions performed by the above described components or structures (units, nodes, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. An economizer component of a controller used for fuel efficient temperature regulation of a medium circulated through a zone within a hydronic or steam heating system, comprising:
    an input interface adapted to determine if the system requires heat based on receiving one or more of:
    a call for heat from the zone, or
    an indication that a burner of the system is active; and
    a dynamic adaptation module configured to selectively assert a burner control signal for heating the system if required, the control signal subjected to an adjustable high limit, the dynamic adaptation module configured to:
        increment the adjustable high limit by an increment value, to a value no greater than a maximum high limit, if it is determined that the system requires heat; and
        decrement the adjustable high limit by a decrement value, to a value no lower than a minimum high limit, if it is determined that the system does not require heat;
    wherein the burner control signal is selectively asserted based on a comparison of a medium temperature to the adjustable high limit and based on the determination of whether the system requires heat; and
    wherein the heating system is configured to dynamically adapt to changing heating system requirements received by the input interface and adjusted by the dynamic adaptation module, to thereby control the burner by way of the burner control signal to regulate the temperature of the medium circulated through the zone within the heating system.

2. The economizer component of claim 1, wherein the adjustable high limit is set to the maximum high limit if a first time limit has been exceeded and it is determined that the system requires heat.

3. The economizer component of claim 1, wherein the adjustable high limit is set to the minimum high limit if a second time limit has been exceeded and it is determined that the system does not require heat.

4. The economizer component of claim 1, wherein the adjustable high limit is set to the maximum high limit if a first time limit has been exceeded and it is determined that the system requires heat, and wherein the adjustable high limit is set to the minimum high limit if a second time limit has been exceeded and it is determined that the system does not require heat.

5. The economizer component of claim 1, wherein the incrementing of the adjustable high limit by the increment value, and the decrementing of the adjustable high limit by the decrement value, are accomplished periodically.

6. The economizer component of claim 1, wherein the increment value and the decrement value are determined from an efficiency look-up table based on the user making a comfort vs. economy prioritization having respective increment and decrement values.

7. The economizer component of claim 1, wherein the incrementing of the adjustable high limit by the increment value, and the decrementing of the adjustable high limit by the decrement value are accomplished by a transition from one level to another comprising one or a combination of a step function, a ramp function, an exponential function, and another functional transition.

8. The economizer component of claim 7, wherein the transition of the incrementing or decrementing of the adjustable high limit is accomplished periodically comprising about every 2 to 3 minutes, and wherein the adjustable high limit transitions from one temperature to another by 2° F. to 3° F.

9. The economizer component of claim 1, wherein the burner receives the control signal and selectively burns a fuel to provide heat for the medium circulated through the heating system in response to the control signal.

10. A controller having an economizer for fuel efficient temperature regulation of a medium circulated through a facility, comprising:

an input interface adapted to determine if the facility requires heat based on receiving one or more of:
a call for heat from a zone of the facility, or
an indication that a burner is active; and
a dynamic adaptation module configured to selectively assert a control signal subjected to an adjustable high limit, used for heating the facility if required, the dynamic adaptation module configured to:
increment the adjustable high limit by an increment value, to a value no greater than a maximum high limit, based on the determination that the facility requires heat, and to set the adjustable high limit to the maximum high limit if a first time limit has been exceeded; and
decrement the adjustable high limit by a decrement value, to a value no lower than a minimum high limit, based on the determination that the facility does not require heat, and to set the adjustable high limit to the minimum high limit if a second time limit has been exceeded;
wherein the control signal is selectively asserted based on a comparison of a medium temperature to the adjustable high limit and based on the determination of whether the system requires heat.

11. The controller of claim 10, further comprising:
a display adapted to display alphanumeric characters.

12. The controller of claim 11, further comprising:
pushbuttons adapted to allow input of data into the controller.

13. The controller of claim 11, further comprising:
a circulator coupled to the controller and adapted to selectively circulate the medium through at least a portion of the facility.

14. A method for efficient temperature regulation of a medium to be circulated through a zone of a hydronic and steam heating system, comprising:
determining if the system requires heat based on receiving one or more of:
a call for heat from the zone of the system, or
an indication that a burner of the system is active; and;
incrementing an adjustable high limit by an increment value, to a value no greater than a maximum high limit, if it is determined that the system requires heat;
decrementing the adjustable high limit by a decrement value, to a value no lower than a minimum high limit, if it is determined that the system does not require heat; and
controlling the burner to heat and regulate the temperature of the medium circulated through the zone within the heating system based on a comparison of a medium temperature to the adjustable high limit and based on the determination of whether the system requires heat;
wherein the heating system is configured to dynamically adapt to the received heating system requirements as adjusted by the incremented and decremented adjustable high limit.

15. The method of claim 14, further comprising:
setting the adjustable high limit to the maximum high limit if a first time limit is exceeded and it is determined that the system requires heat; and
setting the adjustable high limit to the minimum high limit if a second time limit is exceeded and it is determined that the system does not require heat.

16. The method of claim 14, further comprising:
periodically incrementing the adjustable high limit by the increment value, and
periodically decrementing the adjustable high limit by the decrement value.

17. The method of claim 14, further comprising:
determining the increment value and the decrement value from an efficiency look-up table based on the user making a comfort vs. economy prioritization, based on making an efficiency selection corresponding to respective increment and decrement values.

* * * * *